United States Patent
Wan

(10) Patent No.: US 10,739,808 B2
(45) Date of Patent: Aug. 11, 2020

(54) REFERENCE VOLTAGE GENERATOR AND BIAS VOLTAGE GENERATOR

(71) Applicant: RichWave Technology Corp., Taipei (TW)

(72) Inventor: Kuang-Lieh Wan, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 16/425,964

(22) Filed: May 30, 2019

(65) Prior Publication Data
US 2019/0369654 A1    Dec. 5, 2019

Related U.S. Application Data

(60) Provisional application No. 62/678,979, filed on May 31, 2018.

(51) Int. Cl.
*G05F 3/20*    (2006.01)
*H02M 3/158*    (2006.01)

(52) U.S. Cl.
CPC ............ *G05F 3/205* (2013.01); *H02M 3/158* (2013.01)

(58) Field of Classification Search
CPC ........... G05F 3/205; G05F 1/56; H02M 3/158
USPC ........................................................ 327/513
See application file for complete search history.

(56) References Cited

U.S. PATENT DOCUMENTS

| | | | | |
|---|---|---|---|---|
| 4,287,467 A | * | 9/1981 | Gloaguen | G05F 3/30 323/314 |
| 4,490,670 A | * | 12/1984 | Wong | G05F 3/30 323/313 |
| 4,906,863 A | * | 3/1990 | Van Tran | G05F 3/267 327/539 |
| 4,958,086 A | * | 9/1990 | Wang | H03K 19/00361 323/312 |
| 4,999,516 A | * | 3/1991 | Suter | H04W 52/028 327/539 |
| 5,049,806 A | * | 9/1991 | Urakawa | G05F 3/30 323/314 |

(Continued)

FOREIGN PATENT DOCUMENTS

CN    101169671 A    4/2008
CN    102323847 A    1/2012
(Continued)

*Primary Examiner* — Ryan Jager
(74) *Attorney, Agent, or Firm* — Winston Hsu

(57) ABSTRACT

The reference voltage generator includes an output terminal, first to fourth resistors, first to fourth transistors, and a diode unit. The first transistor is coupled to the second transistor. The first resistor is coupled between the second transistor and a second reference voltage terminal. The first resistor is also coupled to the first transistor. One terminal of the diode unit is coupled to the output terminal, and the other terminal of the diode unit is coupled to the second and third resistors. The second and third resistors are also coupled to the first and second transistors, respectively. The third transistor is coupled between the fourth resistor and the second reference voltage terminal, and includes a control terminal coupled to the second transistor. The fourth transistor is coupled between a first reference voltage terminal and the diode unit. The fourth transistor is also coupled to the fourth resistor.

20 Claims, 9 Drawing Sheets

(56) References Cited

U.S. PATENT DOCUMENTS

| | | | | |
|---|---|---|---|---|
| 5,081,410 | A * | 1/1992 | Wood | G05F 3/30 323/315 |
| 5,278,491 | A * | 1/1994 | Nitta | G05F 3/30 323/313 |
| 5,304,918 | A * | 4/1994 | Khieu | G05F 1/567 323/315 |
| 5,339,020 | A * | 8/1994 | Siligoni | G05F 3/222 323/281 |
| 5,834,927 | A * | 11/1998 | Sugawara | G05F 3/30 323/314 |
| 5,986,481 | A * | 11/1999 | Kaminishi | G11C 27/026 327/539 |
| 6,016,074 | A * | 1/2000 | Yamamori | G05F 3/267 323/315 |
| 6,242,981 | B1 * | 6/2001 | Tomiyama | H03G 3/3052 330/141 |
| 6,356,066 | B1 * | 3/2002 | Iliasevitch | G05F 3/265 323/313 |
| 6,683,490 | B2 * | 1/2004 | Kaminishi | H01S 5/042 327/513 |
| 7,023,181 | B2 * | 4/2006 | Nakata | G05F 3/222 322/28 |
| 8,228,122 | B1 | 7/2012 | Yuen | |
| 2008/0129272 | A1 * | 6/2008 | Kimura | G05F 3/30 323/315 |
| 2015/0002131 | A1 | 1/2015 | Takada | |
| 2016/0357212 | A1 | 12/2016 | Horng | |
| 2017/0082505 | A1 | 3/2017 | Matsumoto | |

FOREIGN PATENT DOCUMENTS

| | | |
|---|---|---|
| CN | 203386100 U | 1/2014 |
| CN | 103645769 A | 3/2014 |
| CN | 204462924 U | 7/2015 |
| CN | 105786072 A | 7/2016 |
| CN | 108008755 A | 5/2018 |
| JP | 2016-212837 | 12/2016 |
| TW | 201546597 A | 12/2015 |
| TW | I531885 B | 5/2016 |

\* cited by examiner

REFERENCE VOLTAGE GENERATOR AND BIAS VOLTAGE GENERATOR

CROSS REFERENCE TO RELATED APPLICATION

This application claims priority to provisional Patent Application No. 62/678,979, filed 2018 May 31, and incorporated herein by reference in its entirety.

TECHNICAL FIELD

The invention is related to a reference voltage generator and a bias voltage generator, and more particularly, a reference voltage generator and a bias voltage generator for providing temperature compensation to improve current stability.

BACKGROUND

In applications related to circuits, reference voltage generators are frequently used to generate reference voltages for other circuits to use. A reference voltage generated by a conventional reference voltage generator may be a fixed voltage which is substantially invariant with temperature. When a reference voltage generator is applied with a high performance semiconductor circuit, the semiconductor circuit may generate a bias voltage according to a reference voltage provided by the reference voltage generator. It is better for the bias voltage to be variant with different temperature conditions for better circuit performance. Therefore, how to make a reference voltage generator provide a reference voltage varying with temperature has been a problem to be solved in the field.

SUMMARY

An embodiment provides a reference voltage generator. The reference voltage generator comprises an output terminal, a first resistor, a first transistor, a second transistor, a second resistor, a third resistor, a fourth resistor, a third transistor, a diode unit and a fourth transistor. The output terminal is configured to output a reference voltage. The first resistor comprises a first terminal, and a second terminal. The first transistor comprises a first terminal, a second terminal coupled to the second terminal of the first resistor, and a control terminal coupled to the first terminal of the first transistor. The second transistor comprises a first terminal, a second terminal coupled to the first terminal of the first resistor, and a control terminal coupled to the control terminal of the first transistor. The second resistor comprises a first terminal, and a second terminal coupled to the first terminal of the first transistor. The third resistor comprises a first terminal coupled to the first terminal of the second resistor, and a second terminal coupled to the first terminal of the second transistor. The fourth resistor comprises a first terminal coupled to a first reference voltage terminal, and a second terminal. The third transistor comprises a first terminal coupled to the second terminal of the fourth resistor, a second terminal coupled to the second terminal of the first resistor and a second reference voltage terminal, and a control terminal coupled to the first terminal of the second transistor or the control terminal of the second transistor. The diode unit comprises a first terminal coupled to the output terminal of the reference voltage generator, and a second terminal coupled to the first terminal of the third resistor. The fourth transistor comprises a first terminal coupled to the first terminal of the fourth resistor, a second terminal coupled to the first terminal of the diode unit, and a control terminal coupled to the second terminal of the fourth resistor.

Another embodiment provides a bias voltage generator. The bias voltage generator comprises a reference voltage generator and a bias circuit. The reference voltage generator comprises an output terminal, a first resistor, a first transistor, a second transistor, a second resistor, a third resistor, a fourth resistor, a third transistor, a diode unit and a fourth transistor. The output terminal is configured to output a reference voltage. The first resistor comprises a first terminal, and a second terminal. The first transistor comprises a first terminal, a second terminal coupled to the second terminal of the first resistor, and a control terminal coupled to the first terminal of the first transistor. The second transistor comprises a first terminal, a second terminal coupled to the first terminal of the first resistor, and a control terminal coupled to the control terminal of the first transistor. The second resistor comprises a first terminal, and a second terminal coupled to the first terminal of the first transistor. The third resistor comprises a first terminal coupled to the first terminal of the second resistor, and a second terminal coupled to the first terminal of the second transistor. The fourth resistor comprises a first terminal coupled to a first reference voltage terminal, and a second terminal. The third transistor comprises a first terminal coupled to the second terminal of the fourth resistor, a second terminal coupled to the second terminal of the first resistor and a second reference voltage terminal, and a control terminal coupled to the first terminal of the second transistor or the control terminal of the second transistor. The diode unit comprises a first terminal coupled to the output terminal of the reference voltage generator, and a second terminal coupled to the first terminal of the third resistor. The fourth transistor comprises a first terminal coupled to the first terminal of the fourth resistor, a second terminal coupled to the first terminal of the diode unit, and a control terminal coupled to the second terminal of the fourth resistor. The bias circuit comprises an input terminal coupled to the output terminal of the reference voltage generator, and an output terminal coupled to a bias terminal of an amplifier.

DETAILED DESCRIPTION

Figure 1:
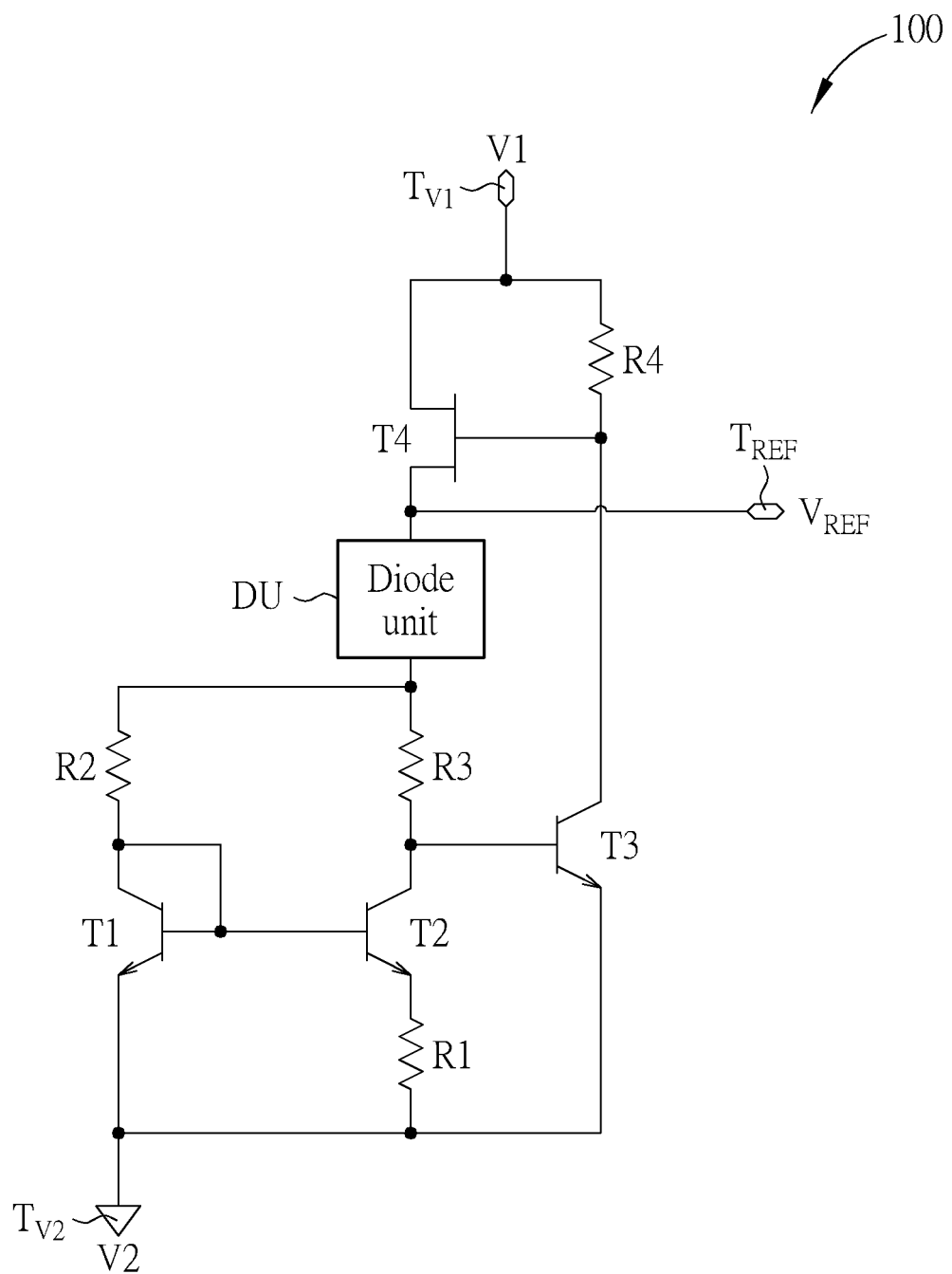
FIG. 1 illustrates a reference voltage generator according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 illustrates a reference voltage generator 100 according to an embodiment. The reference voltage generator 100 may comprise an output terminal $T_{REF}$, resistors R1 to R4, transistors T1 to T4 and a diode unit DU. The output terminal $T_{REF}$ is configured to output a reference voltage $V_{REF}$. The resistor R1 comprises a first terminal and a second terminal. The transistor T1 comprises a first terminal, a second terminal coupled to the second terminal of the resistor R1, and a control terminal coupled to the first terminal of the transistor T1. The transistor T2 comprises a first terminal, a second terminal coupled to the first terminal of the resistor R1, and a control terminal coupled to the control terminal of the transistor T1. The resistor R2 comprises a first terminal, and a second terminal coupled to the first terminal of the transistor T1. The resistor R3 comprises a first terminal coupled to the first terminal of the resistor R2, and a second terminal coupled to the first terminal of the transistor T2. The resistor R4 comprises a first terminal coupled to a reference voltage terminal $T_{V1}$, and a second terminal. The transistor T3 comprises a first terminal coupled to the second terminal of the resistor R4, a second terminal coupled to the second terminal of the resistor R1 and a reference voltage terminal $T_{V2}$, and a control terminal coupled to the first terminal of the transistor T2 or the control terminal of the transistor T2. As shown in FIG. 1, the control terminal of the transistor T3 is coupled to the first terminal of the transistor T2 as an example. The diode unit DU comprises a first terminal coupled to the output terminal $T_{REF}$ of the reference voltage generator 100, and a second terminal coupled to the first terminal of the resistor R3. The transistor T4 comprises a first terminal coupled to the first terminal of the resistor R4, a second terminal coupled to the first terminal of the diode unit DU, and a control terminal coupled to the second terminal of the resistor R4. Because a forward voltage drop of the diode unit DU may be substantially variant with temperature, by coupling the diode unit DU to the output terminal $T_{REF}$ of the reference voltage generator 100, a temperature coefficient may be provided for compensating the reference voltage $V_{REF}$. When temperature increases, the reference voltage $V_{REF}$ may decrease. When temperature decreases, the reference voltage $V_{REF}$ may increase. In other words, the reference voltage $V_{REF}$ outputted by the reference voltage generator 100 may be substantially variant with temperature, and the relationship between the reference voltage $V_{REF}$ and temperature may be negative correlation.

Figure 2:
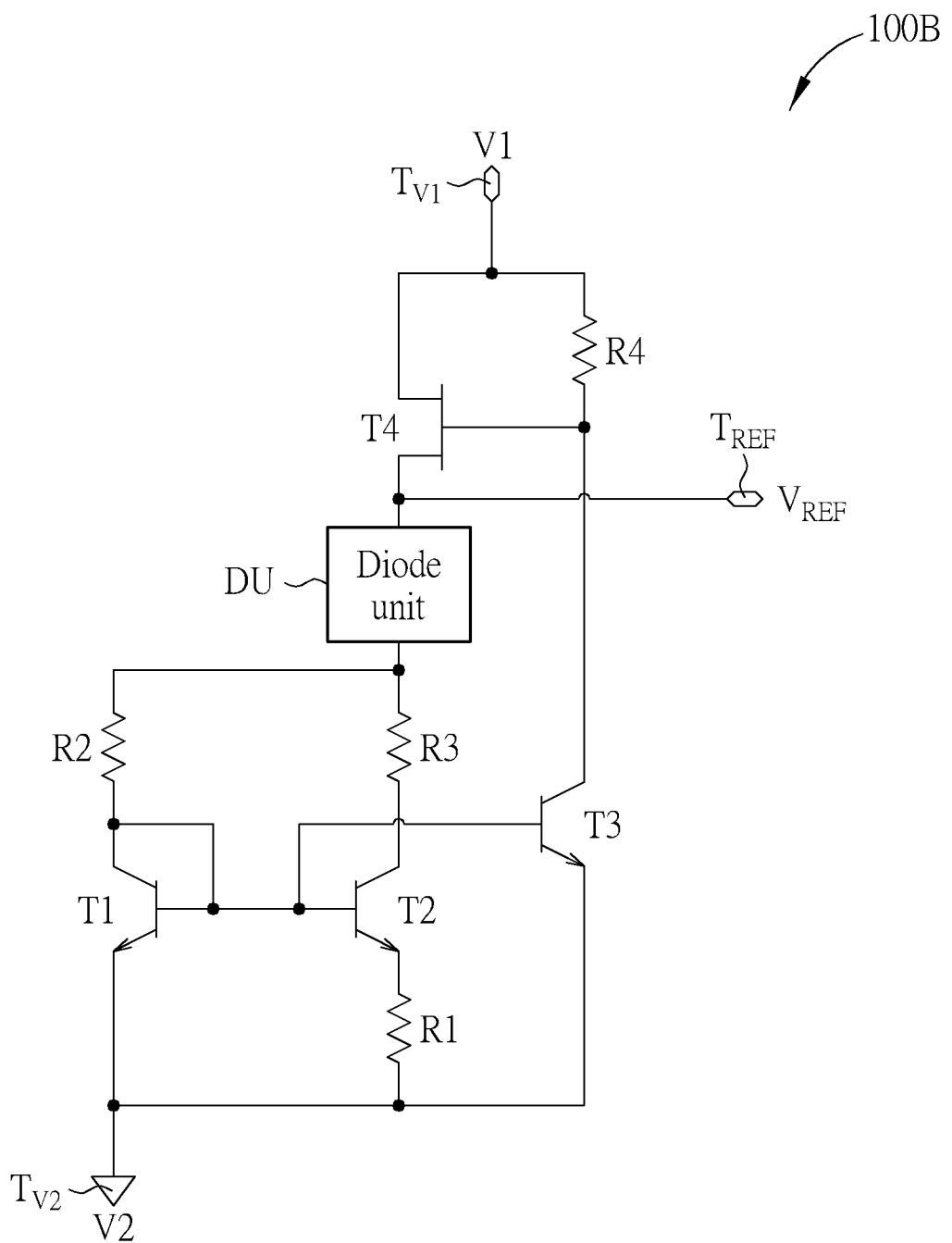
FIG. 2 illustrates a reference voltage generator according to another embodiment.

FIG. 2 illustrates a reference voltage generator 100B according to another embodiment. The reference voltage generator 100B may be similar to the reference voltage generator 100 of FIG. 1. However, as shown in FIG. 2, the control terminal of the transistor T3 is coupled to the control terminal of the transistor T2 as an example. According to an embodiment, each of the structures shown in FIG. 1 and FIG. 2 may generate a reference voltage $V_{REF}$ being substantially variant with temperature.

Figure 3:
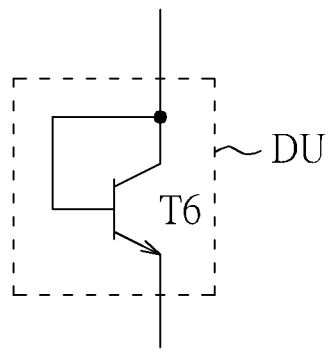
FIG. 3 illustrates a circuit of the diode unit of FIG. 1 and FIG. 2 according to an embodiment.

FIG. 3 illustrates a circuit of the diode unit DU of FIG. 1 and FIG. 2 according to an embodiment. As shown in FIG. 3, the diode unit DU comprises a transistor T6 comprising a first terminal coupled to the first terminal of the diode unit DU, a second terminal coupled to the second terminal of the diode unit DU, and a control terminal coupled to the first terminal of the transistor T6.

Figure 4:
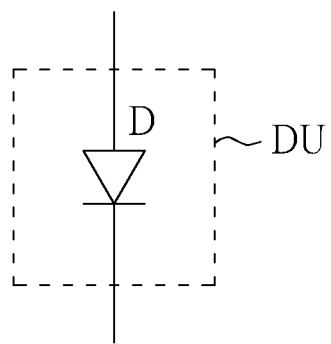
FIG. 4 illustrates a circuit of the diode unit of FIG. 1 and FIG. 2 according to another embodiment.

FIG. 4 illustrates a circuit of the diode unit DU of FIG. 1 and FIG. 2 according to another embodiment. As shown in FIG. 4, the diode unit DU comprises a diode D. The diode D comprises a first terminal coupled to the first terminal of the diode unit DU, and a second terminal coupled to the second terminal of the diode unit DU where the first terminal may be a anode and the second terminal may be a cathode.

Figure 5:
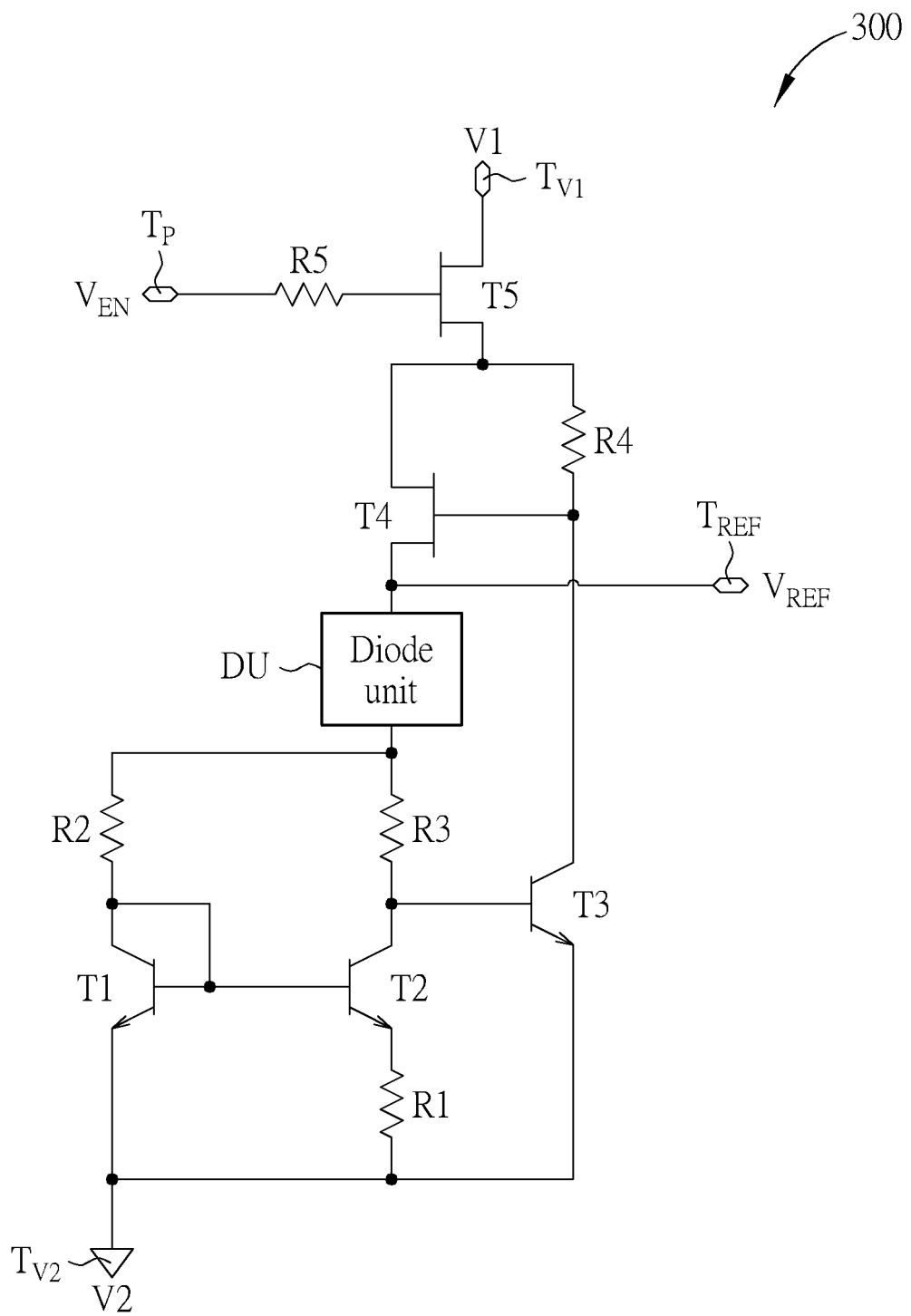
FIG. 5 illustrates a reference voltage generator according to another embodiment.

FIG. 5 illustrates a reference voltage generator 300 according to another embodiment. The reference voltage generator 300 is similar to the reference voltage generator 100 of FIG. 1. However, the reference voltage generator 300 further comprises a transistor T5. The transistor T5 comprises a first terminal coupled to the reference voltage terminal $T_{V1}$, a second terminal coupled to the first terminal of the transistor T4, and a control terminal coupled to a power terminal $T_P$. According to an embodiment, the power terminal $T_P$ may be used to receive an enable signal $V_{EN}$. According to an embodiment, the transistor T5 may operate as a switch being controlled with the enable signal $V_{EN}$ for controlling whether the reference voltage generator 300 outputs the reference voltage $V_{REF}$. For example, when the enable signal $V_{EN}$ is at an enable level, the transistor T5 may be turned on, and the reference voltage generator 300 may output the reference voltage $V_{REF}$. When the enable signal $V_{EN}$ is at a disable level, the transistor T5 may be turned off, and the reference voltage generator 300 may not output the reference voltage $V_{REF}$. As shown in FIG. 1, FIG. 2 and FIG. 5, the transistor T5 may be optionally used as needed. As shown in FIG. 5, the reference voltage generator 300 may optionally further include a resistor R5 coupled between the power terminal $T_P$ and the control terminal of the transistor T5. The resistor R5 may be a current-limiting resistor.

According to embodiments, the reference voltage terminal $T_{V1}$ is used for receiving a reference voltage V1. The reference voltage terminal $T_{V2}$ is used for receiving a reference voltage V2. The reference voltage V1 is higher than the reference voltage V2. For example, the reference voltage terminal $T_{V2}$ may be (but not limited to) a ground terminal.

According to an embodiment, the transistors T1, T2 and T3 may be of an identical type of transistor, the transistor T6 may be of the type of transistor as the transistors T1, T2 and T3 when the diode unit DU is formed as FIG. 3, and the transistor T2 may optionally be of the type of transistor as the transistors T1 and T3 as needed. For example, each of the transistors T1, T2, T3 and T6 may be a bipolar junction transistor (BJT). For example, each of the transistors T1, T2, T3 and T6 may be a heterojunction bipolar transistor (HBT). According to an embodiment, the transistor T6 may be a GaAs HBT or a SiGe HBT. According to another embodiment, the transistor T6 may be a field effect transistor (FET). According to an embodiment, the transistor T2 is formed using n transistors, where each of the n transistors comprises a first terminal coupled to the first terminal of the transistor T2, a second terminal coupled to the second terminal of the transistor T2, and a control terminal coupled to the control terminal of the transistor T2, and n is a positive integer larger than zero. According to an embodiment, each of the transistors T4 and T5 may be an FET. According to an embodiment, each of the transistors T4 and T5 may be a depletion-mode (D-mode) pseudomorphic high electron mobility transistor (PHEMT) or an enhancement-mode (E-mode) PHEMT.

Figure 6:
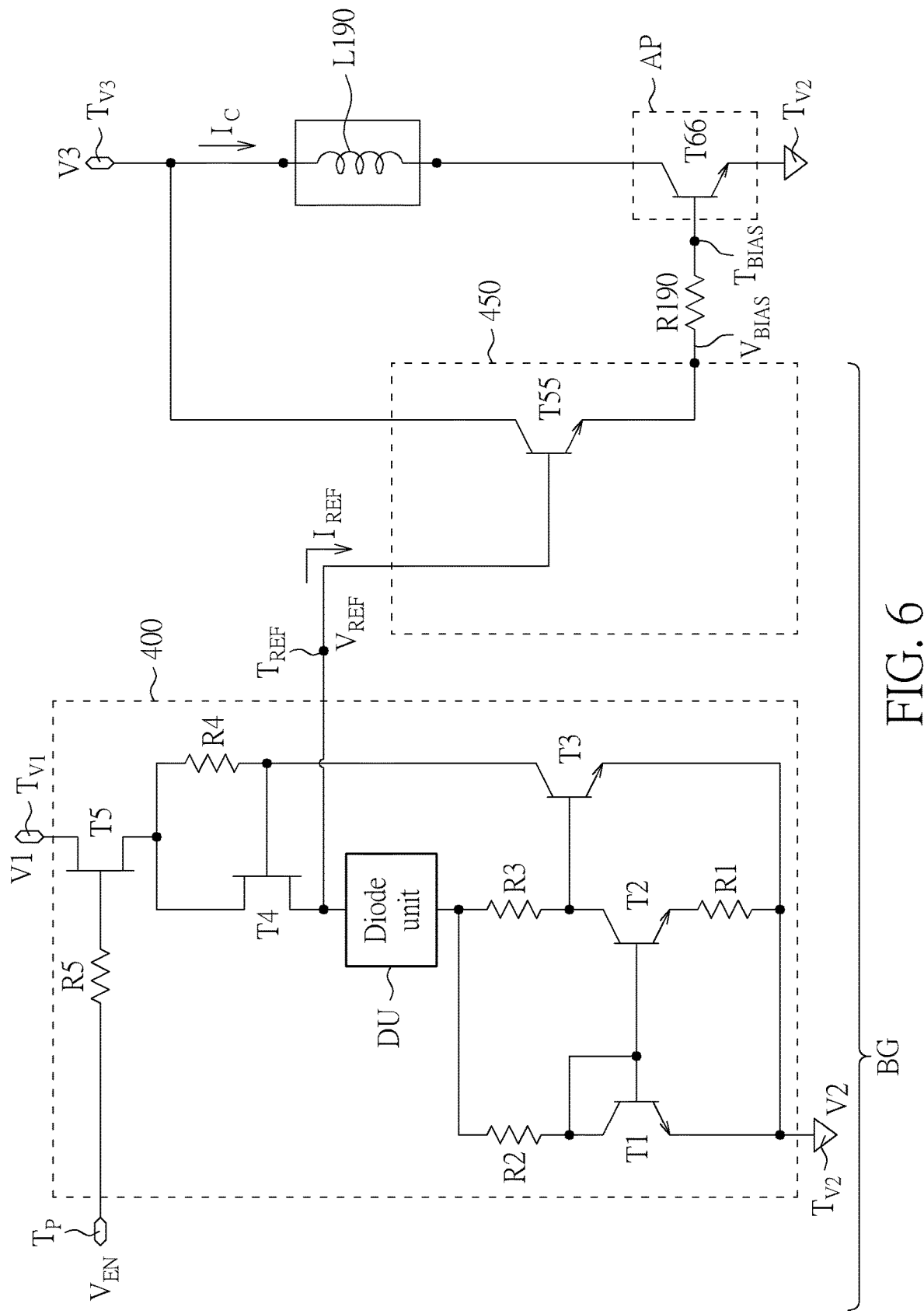
FIG. 6 illustrates an application of a reference voltage generator according to an embodiment.

FIG. 6 illustrates an application of a reference voltage generator according to an embodiment. According to an embodiment, the reference voltage generator 400 may generate a reference voltage $V_{REF}$ for a bias circuit 450 to use. According to an embodiment, the reference voltage generator 400 and the bias circuit 450 may form at least a part of a bias voltage generator BG. As shown in FIG. 6, the bias voltage generator BG may include the reference voltage generator 400 and the bias circuit 450. The reference voltage generator 400 may be used to generate a reference voltage $V_{REF}$ substantially varying with temperature. The bias circuit 450 may generate a bias voltage $V_{BIAS}$ under a corresponding temperature condition according to the reference voltage $V_{REF}$. According to an embodiment, the bias voltage generator BG may be coupled to an amplifier AP for outputting the bias voltage $V_{BIAS}$ to the amplifier AP. According to an embodiment, the bias voltage $V_{BIAS}$ may be a direct-current (DC) voltage. As shown in FIG. 6, the bias circuit 450 may comprise an input terminal coupled to the output terminal $T_{REF}$ of the reference voltage generator 400, and an output terminal coupled to a bias terminal $T_{BIAS}$ of the amplifier AP. According to an embodiment, the amplifier AP may be a power amplifier (PA), a low noise amplifier (LNA) or another type of amplifier. The amplifier AP may be used to input an alternating-current (AC) signal such as a radio-frequency (RF) signal, amplify the inputted AC signal, and output the amplified AC signal. The reference voltage generator 400 shown in FIG. 6 may be similar to the reference voltage generator 300 of FIG. 5 where the diode unit DU includes a transistor T6 as shown in FIG. 3. However, the circuit of the reference voltage generator 400 shown in FIG. 6 is merely an example, the reference voltage generator 400 in FIG. 6 and of embodiments described below may be one of the reference voltage generators 100, 100B and 300 of FIG. 1, FIG. 2 and FIG. 5. The diode unit DU in FIG. 6 and of embodiments described below may have a structure shown in FIG. 3 or FIG. 4 according to embodiments.

In FIG. 6, the bias circuit 450 comprises a transistor T55, and the amplifier AP comprises a transistor T66. According to an embodiment, the transistor T55 of the bias circuit 450 comprises a first terminal, a second terminal coupled to the output terminal of the bias circuit 450 for outputting a bias voltage $V_{BIAS}$ to the amplifier AP, and a control terminal. The transistor T66 of the amplifier AP comprises a first terminal, a second terminal coupled to the reference voltage terminal $T_{V2}$, and a control terminal coupled to the bias terminal $T_{BIAS}$ of the amplifier AP. The control terminal of the transistor T66 may be used to input an RF signal, and the first terminal of the transistor T66 may be used to output the amplified RF signal.

As shown in FIG. 6, a resistor R190 may be coupled between the output terminal of the bias circuit 450 and the bias terminal $T_{BIAS}$ of the amplifier AP according to an embodiment. The resistor R190 may be a ballast resistor. As shown in FIG. 6, an inductor L190 may be coupled between a reference voltage terminal $T_{V3}$ and the amplifier AP where the reference voltage terminal $T_{V3}$ is used to receive a reference voltage V3. According to an embodiment, the reference voltage V3 may be substantially equal to the reference voltage V1 received by the reference voltage terminal $T_{V1}$. In the example of FIG. 6, the inductor L190 is coupled between the reference voltage terminal $T_{V3}$ and the first terminal of the transistor T66 of the amplifier AP. The inductor L190 may be a choke inductor.

FIG. 6 is merely an example rather than limiting the scope of embodiments. The bias circuit 450 and the amplifier AP may be formed using other circuits as described below. As shown in FIG. 6 to FIG. 10, a current $I_{REF}$ may flow to the input terminal of the bias circuit 450. Another current $I_C$ may flow to the amplifier AP.

Figure 7:
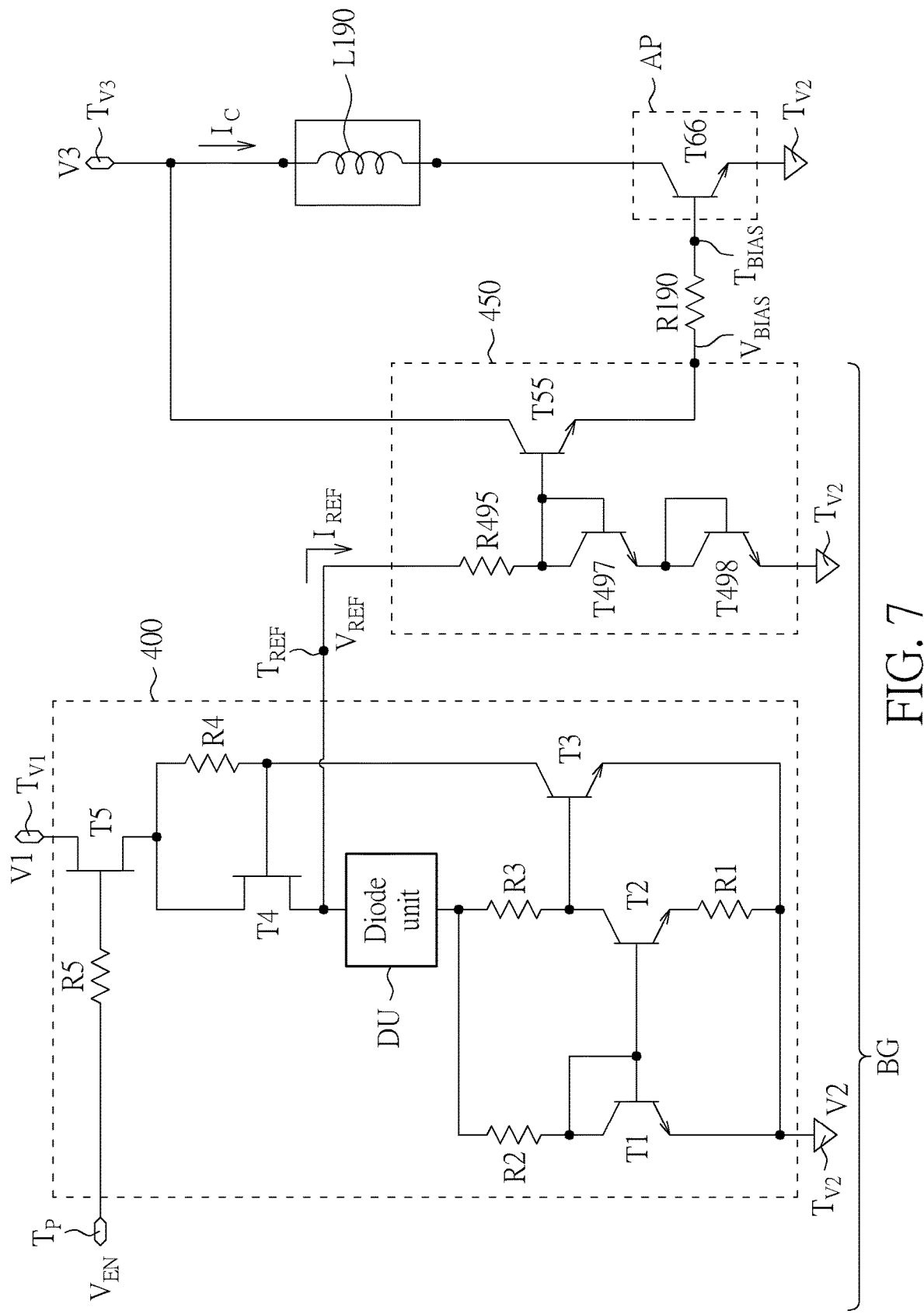
FIG. 7 illustrates an application of a reference voltage generator according to another embodiment.

FIG. 7 illustrates an application of a reference voltage generator according to another embodiment. FIG. 7 may be similar to FIG. 6, and the bias circuit 450 of FIG. 7 may have a different circuit as compared with the bias circuit 450 of FIG. 6. According to an embodiment, the amplifier AP of FIG. 7 may be a PA. As in FIG. 6, in FIG. 7, the first terminal of the transistor T55 and the first terminal of the transistor T66 are coupled to the reference voltage terminal $T_{V3}$. In the example of FIG. 7, the current $I_C$ may flow to the first terminal of the transistor T66. According to an embodiment, the control terminal of the transistor T66 may be used to input an RF signal, and the first terminal of the transistor T66 may be used to output the amplified RF signal. Compared with FIG. 6, the bias circuit 450 of FIG. 7 may further comprise a resistor R495 and transistors T497 to T498. The resistor R495 comprises a first terminal coupled to the input terminal of the bias circuit 450, and a second terminal coupled to the control terminal of the transistor T55. The transistor T497 comprises a first terminal coupled to the second terminal of the resistor R495, a second terminal, and a control terminal coupled to the first terminal of the transistor T497. The transistor T498 comprises a first terminal coupled to the second terminal of the transistor T497, a second terminal coupled to the reference voltage terminal $T_{V2}$, and a control terminal coupled to the first terminal of the transistor T498. According to an embodiment, each of the transistors T497 and T498 may be replaced with a diode which is diode-connected.

When the bias circuit 450 is used to receive a fixed reference voltage generated by a conventional reference voltage generator, because forward voltage drops of the transistors T497 and T498 may substantially vary with temperature where the relationship between the forward voltage drop of each of the transistors T497 and T498 and temperature is negative correlation, the current $I_{REF}$ may be expressed as an equation $I_{REF} = (V_{REF} - 2(V_{BE} + V_{AT}))/R$. In the equation, R may be a resistance of the resistor R495, $V_{BE}$ may be a voltage difference between a control terminal (e.g., a base terminal) and a second terminal (e.g., an emitter terminal) of a transistor such as each of the transistors T497 and T498, and $V_{AT}$ may be a variable voltage value corresponding to a variance of temperature. The variable voltage value $V_{AT}$ may correspond to forward voltage drops of the transistors T497 and T498. In other words, when temperature increases, the voltage difference $V_{BE}$ may decrease, and the current $I_{REF}$ may increase; and when temperature decreases, the voltage difference $V_{BE}$ may increase, and the current $I_{REF}$ may decrease. Hence, a relation between the current $I_{REF}$ and temperature may be positive correlation according to a conventional technique. When the current $I_{REF}$ varies with temperature, the current $I_C$ may also substantially vary with temperature when using a conventional technique. However, according to an embodiment of the disclosure, the currents $I_{REF}$ and/or $I_C$ may be stable and substantially invariant with temperature. As shown in FIG. 6 to FIG. 10, when the bias circuit 450 is used to receive the reference voltage $V_{REF}$ generated by the reference voltage generator 400 in an embodiment, the reference voltage $V_{REF}$ may substantially vary with temperature and be negatively correlated with temperature, so the positive correlation between the current $I_{REF}$ and temperature may be compensated according to an embodiment. The current $I_{REF}$ may be stable, and the current $I_C$ may be substantially stable without varying with temperature. For example, the current $I_C$ may vary with temperature by less than a predetermined ratio (e.g., 5%) at a temperature in a range (e.g., −40° C. to 80° C.). According to an embodiment, the current $I_c$ may vary with temperature by less than 0.5% at a temperature between −40° C. to 80° C. Hence, the performance of the amplifier AP may be improved.

According to an embodiment, for example, in FIG. 7, the transistors T1 and T3 of the reference voltage generator 400, the transistors T55, T497 and T498 of the bias circuit 450, the transistor T66 of the amplifier AP, and the transistor T6 of the diode unit DU may have a substantially identical temperature coefficient. According to an embodiment, the transistors T1, T497 and T498 may have an identical type of junction between a control terminal (e.g., a base terminal) and a second terminal (e.g., an emitter terminal) of a transistor. The transistors T1, T497 and T498 may have an identical temperature coefficient of a turn-on voltage where the turn-on voltage may be a voltage difference between a control terminal and a second terminal of a transistor (e.g., $V_{BE}$).

According to an embodiment, for example, in FIG. 7, the transistors T1 and T3 of the reference voltage generator 400, transistors T55, T497 and T498 of the bias circuit 450, the transistor T66 of the amplifier AP, and the transistor T6 of the diode unit DU may be of an identical type of transistor. For example, according to an embodiment, these transistors may be BJTs. According to another embodiment, these transistors may be HBTs. According to another embodiment, the transistors T6, T497 and T498 may be GaAs HBTs or SiGe HBTs. According to another embodiment, the transistors T1, T3, T55, T497, T498, T66 and T6 may be FETs. When a transistor is a BJT, in the transistor, a first terminal may be a collector terminal, a second terminal may be an emitter terminal, and a control terminal may be abase terminal. When a transistor is a FET, in the transistor, a first terminal may be a drain terminal, a second terminal may be a source terminal, and a control terminal may be a gate terminal.

By selecting appropriate type(s) of transistors, a first temperature coefficient corresponding to the reference voltage $V_{REF}$ generated by the reference voltage generator 400 may be close to a second temperature coefficient corresponding to the operation of the amplifier AP. Hence, the currents $I_{REF}$ and/or $I_c$ may be more stable and substantially invariant with temperature, and compensation related to temperature may be provided.

Figure 8:
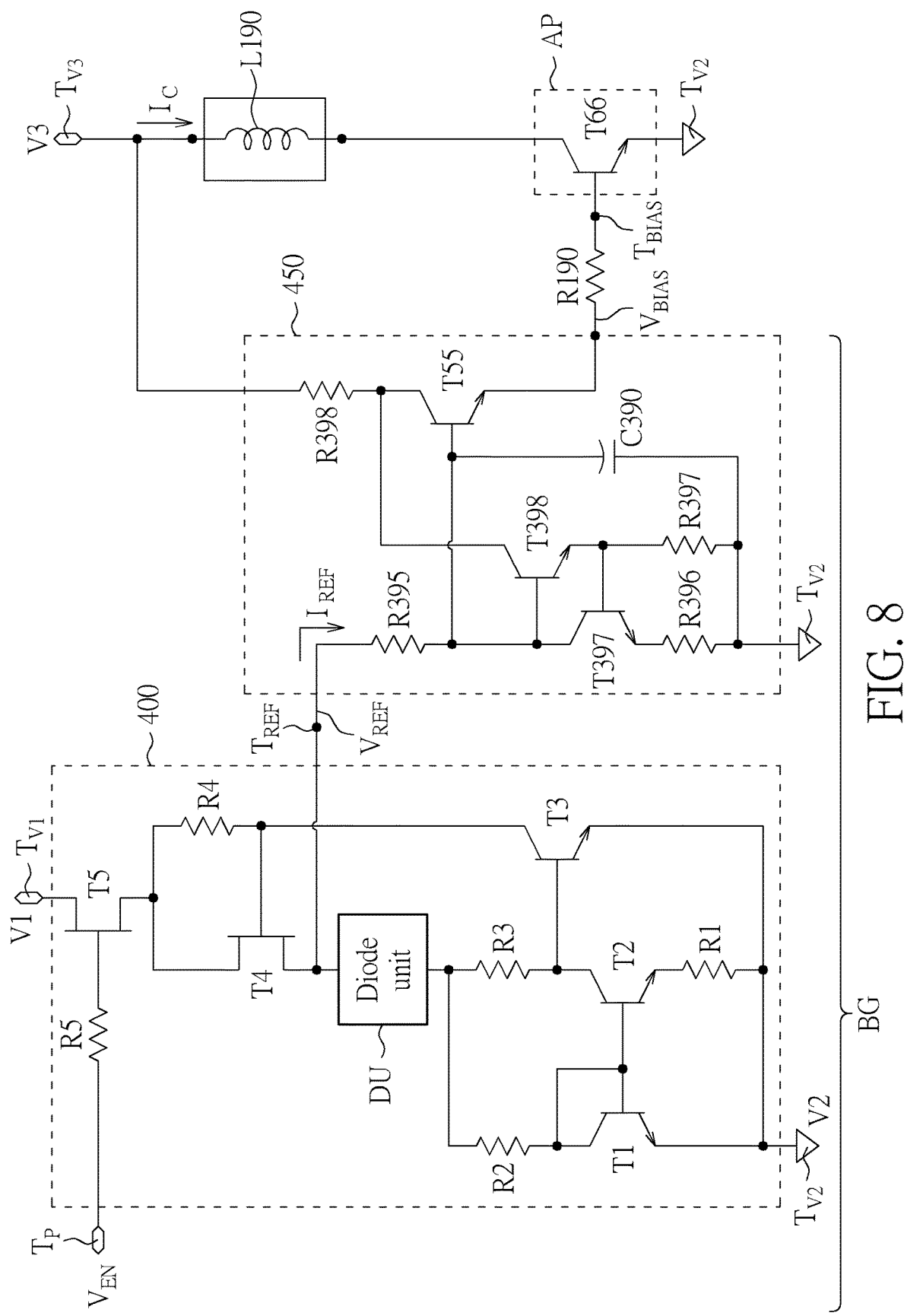
FIG. 8 illustrates an application of a reference voltage generator according to another embodiment.

FIG. 8 illustrates an application of a reference voltage generator according to another embodiment. FIG. 8 may be similar to FIG. 6, and the bias circuit 450 of FIG. 8 may have a different circuit as compared with the bias circuit 450 of FIG. 6. According to an embodiment, the amplifier AP of FIG. 8 may be a PA. As in FIG. 6, in FIG. 8, the first terminal of the transistor T66 is coupled to the reference voltage terminal $T_{V3}$. In the example of FIG. 8, the current $I_C$ may flow to the first terminal of the transistor T66. According to an embodiment, the control terminal of the transistor T66 may be used to input an RF signal, and the first terminal of the transistor T66 may be used to output the amplified RF signal. Compared with FIG. 6, the bias circuit 450 in FIG. 8 may further comprise resistors R395 to R398, transistors T397 to T398 and a capacitor C390. The resistor R395 comprises a first terminal coupled to the input terminal of the bias circuit 450, and a second terminal coupled to the control terminal of the transistor T55. The transistor T397 comprises a first terminal coupled to the second terminal of the resistor R395, a second terminal, and a control terminal. The transistor T398 comprises a first terminal coupled to the first terminal of the transistor T55, a second terminal coupled to the control terminal of the transistor T397, and a control terminal coupled to the first terminal of the transistor T397. The resistor R396 comprises a first terminal coupled to the second terminal of the transistor T397, and a second terminal coupled to the reference voltage terminal $T_{V2}$. The resistor R397 comprises a first terminal coupled to the second terminal of the transistor T398, and a second terminal coupled to the reference voltage terminal $T_{V2}$. The resistor R398 comprises a first terminal coupled to the reference voltage terminal $T_{V3}$, and a second terminal coupled to the first terminal of the transistor T55. The capacitor C390 comprises a first terminal coupled to the control terminal of the transistor T55, and a second terminal coupled to the reference voltage terminal $T_{V2}$.

Figure 9:
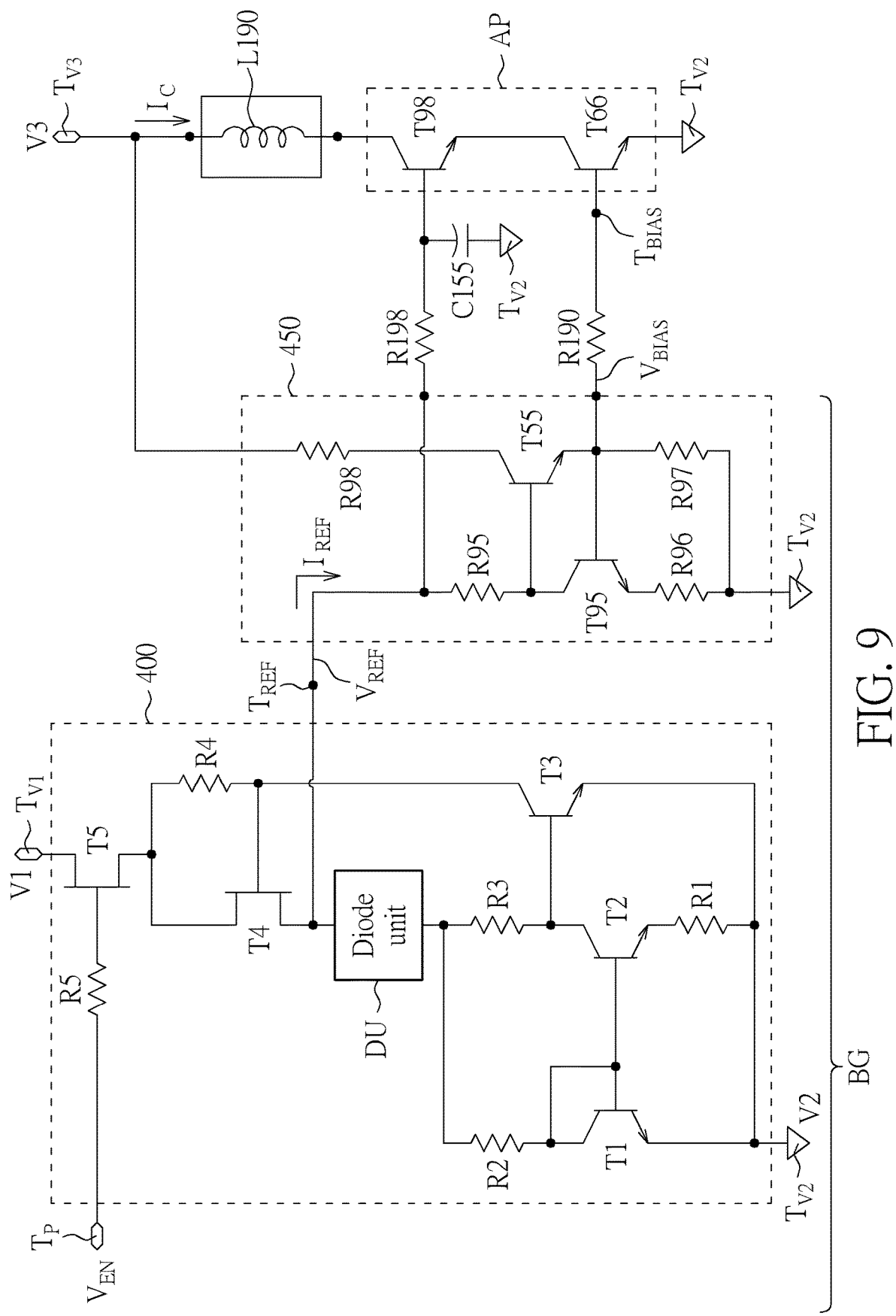
FIG. 9 illustrates an application of a reference voltage generator according to another embodiment.

FIG. 9 illustrates an application of a reference voltage generator according to another embodiment. FIG. 9 may be similar to FIG. 6, and the bias circuit 450 and the amplifier AP of FIG. 9 may have different circuits as compared with the bias circuit 450 and the amplifier AP of FIG. 6. According to an embodiment, the amplifier AP of FIG. 9 may be a LNA. Compared with FIG. 6, the bias circuit 450 of FIG. 9 may further comprise a transistor T95 and resistors R95 to R98. The transistor T95 comprises a first terminal coupled to the control terminal of the transistor T55, a second terminal, and a control terminal coupled to the output terminal of the bias circuit 450. The resistor R95 comprises a first terminal coupled to the input terminal of the bias circuit 450, and a second terminal coupled to the first terminal of the transistor T95. The resistor R96 comprises a first terminal coupled to the second terminal of the transistor T95, and a second terminal coupled to the reference voltage terminal $T_{V2}$. The resistor R97 comprises a first terminal coupled to the second terminal of the transistor T55, and a second terminal coupled to the reference voltage terminal $T_{V2}$. The resistor R98 comprises a first terminal coupled to the reference voltage terminal $T_{V3}$, and a second terminal coupled to the first terminal of the transistor T55. According to an embodiment, compared with FIG. 6, as shown in FIG. 9, the amplifier AP may further comprise a transistor T98. The transistor T98 comprises a first terminal coupled to the reference voltage terminal $T_{V3}$, a second terminal coupled to the first terminal of the transistor T66, and a control terminal coupled to the first terminal of the resistor R95. The transistors T98 and T66 may form a cascode structure. The control terminal of the transistor T66 may be used to input an RF signal, and the first terminal of the transistor T98 may be used to output the amplified RF signal. In the example of FIG. 9, the current $I_C$ may flow to the first terminal of the transistor T98.

According to embodiments, in FIG. 9, a resistor R198 may be coupled between the first terminal of the resistor R95 and the control terminal of the transistor T98. The resistor R198 may be a ballast resistor. A capacitor C155 may be coupled between the control terminal of the transistor T98 and the reference voltage terminal $T_{V2}$. The capacitor C155 may be a decoupling capacitor.

Figure 10:
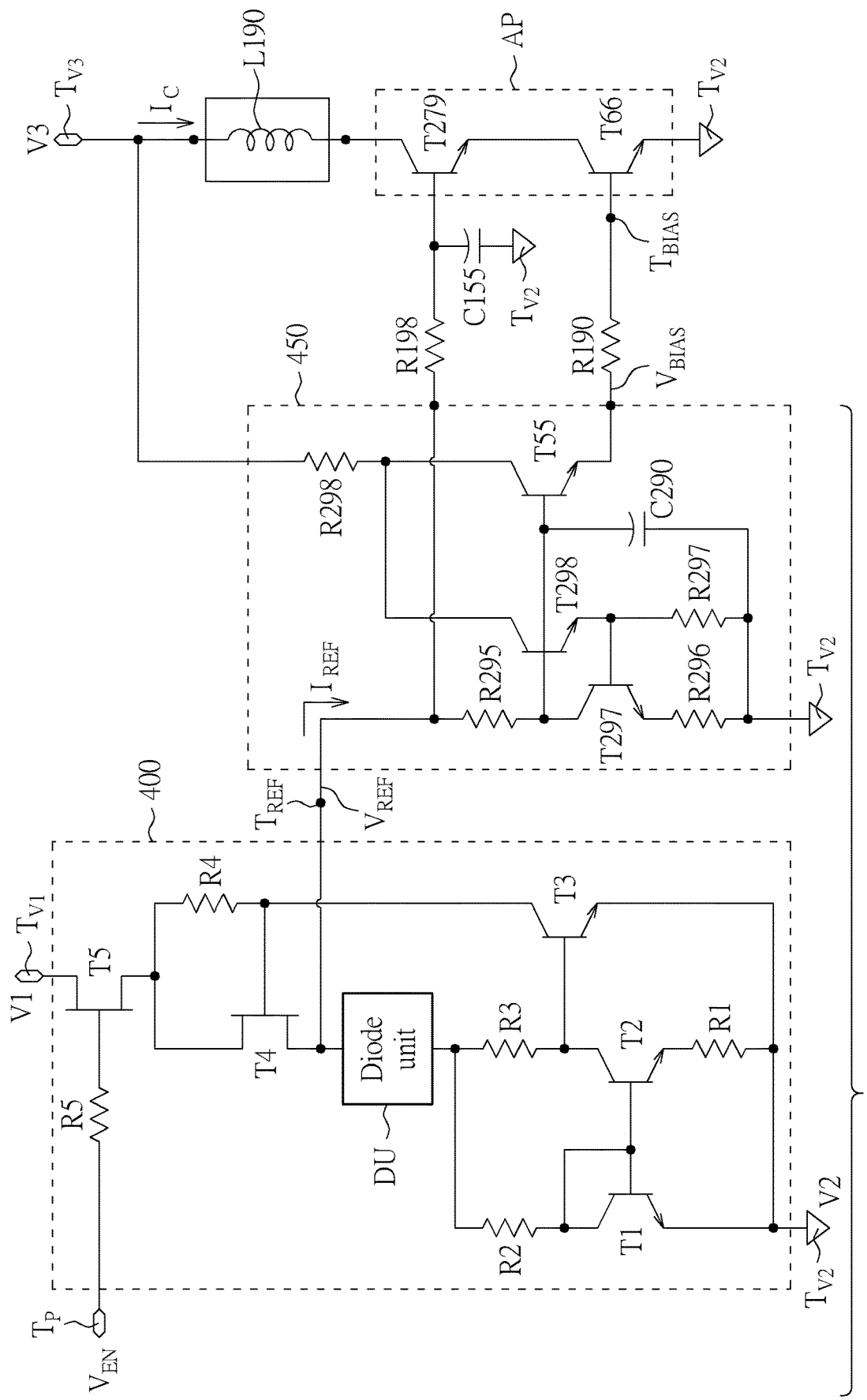
FIG. 10 illustrates an application of a reference voltage generator according to another embodiment.

FIG. 10 illustrates an application of a reference voltage generator according to another embodiment. FIG. 10 may be similar to FIG. 6, and the bias circuit 450 and the amplifier AP of FIG. 10 may have different circuits as compared with the bias circuit 450 and the amplifier AP of FIG. 6. According to an embodiment, the amplifier AP of FIG. 10 may be a LNA. Compared with FIG. 6, the bias circuit 450 of FIG. 10 may further comprise resistors R295 to R298, transistors T297 to T298 and a capacitor 290. The resistor R295 comprises a first terminal coupled to the input terminal of the bias circuit 450, and a second terminal. The transistor T297 comprises a first terminal coupled to the second terminal of the resistor R295, a second terminal, and a control terminal. The transistor T298 comprises a first terminal coupled to the first terminal of the transistor T55, a second terminal coupled to the control terminal of the transistor T297, and a control terminal coupled to the first terminal of the transistor T297 and the control terminal of the transistor T55. The resistor R296 comprises a first terminal coupled to the second terminal of the transistor T297, and a second terminal coupled to the reference voltage terminal $T_{r2}$. The resistor R297 comprises a first terminal coupled to the second terminal of the transistor T298, and a second terminal coupled to the reference voltage terminal $T_{r2}$. The resistor R298 comprises a first terminal coupled to the reference voltage terminal $T_{r3}$, and a second terminal coupled to the first terminal of the transistor T55. The capacitor 290 comprises a first terminal coupled to the control terminal of the transistor T55, and a second terminal coupled to the reference voltage terminal $T_{r2}$.

Compared with FIG. 6, as shown in FIG. 10, the amplifier AP may further comprise a transistor T279. The transistor T279 comprises a first terminal coupled to the reference voltage terminal $T_{r3}$, a second terminal coupled to the first terminal of the transistor T66, and a control terminal coupled to the first terminal of the resistor R295. The transistors T279 and T66 may form a cascode structure. The control terminal of the transistor T66 may be used to input an RF signal, and the first terminal of the transistor T279 may be used to output the amplified RF signal. In the example of FIG. 10, the current $I_C$ may flow to the first terminal of the transistor T279.

As in FIG. 9, in FIG. 10, the resistors R190 and R198 may be coupled between the bias circuit 450 and the amplifier AP where the resistors R190 and R198 may be ballast resistors. As in FIG. 9, the capacitor C155 may be coupled between the control terminal of the transistor T279 and the reference voltage terminal $T_{r2}$. The capacitor C155 may be a decoupling capacitor.

In summary, a reference voltage generator of an embodiment may be used to generate a reference voltage substantially varying with temperature and be used for a circuit needing corresponding voltages under difference temperature conditions. A bias voltage generator of an embodiment may be formed with an abovementioned reference voltage generator to generate different bias voltages corresponding to different temperature conditions. When a bias voltage generator of an embodiment is used to generate a bias voltage for an amplifier, a current flowing to a bias circuit and another current flowing to the amplifier may be currents being substantially invariant with temperature since compensation related to temperature is performed. Hence, the performance of the amplifier may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reference voltage generator comprising:
    an output terminal configured to output a reference voltage;
    a first resistor comprising a first terminal, and a second terminal;
    a first transistor comprising a first terminal, a second terminal coupled to the second terminal of the first resistor, and a control terminal coupled to the first terminal of the first transistor;
    a second transistor comprising a first terminal, a second terminal coupled to the first terminal of the first resistor, and a control terminal coupled to the control terminal of the first transistor;
    a second resistor comprising a first terminal, and a second terminal coupled to the first terminal of the first transistor;
    a third resistor comprising a first terminal coupled to the first terminal of the second resistor, and a second terminal coupled to the first terminal of the second transistor;
    a fourth resistor comprising a first terminal coupled to a first reference voltage terminal, and a second terminal;
    a third transistor comprising a first terminal coupled to the second terminal of the fourth resistor, a second terminal coupled to the second terminal of the first resistor and a second reference voltage terminal, and a control terminal coupled to the first terminal of the second transistor or the control terminal of the second transistor;
    a diode unit comprising a first terminal coupled to the output terminal of the reference voltage generator, and a second terminal coupled to the first terminal of the third resistor; and
    a fourth transistor comprising a first terminal coupled to the first terminal of the fourth resistor, a second terminal coupled to the first terminal of the diode unit, and a control terminal coupled to the second terminal of the fourth resistor.

2. The reference voltage generator of claim 1, wherein the reference voltage substantially varies with temperature.

3. The reference voltage generator of claim 1, further comprising:
    a fifth transistor comprising a first terminal coupled to the first reference voltage terminal, a second terminal coupled to the first terminal of the fourth transistor, and a control terminal coupled to a power terminal.

4. The reference voltage generator of claim 1, wherein the first reference voltage terminal is configured to receive a first reference voltage, the second reference voltage terminal is configured to receive a second reference voltage, and the first reference voltage is higher than the second reference voltage.

5. The reference voltage generator of claim 1, wherein the diode unit comprises:
    a diode comprising a first terminal coupled to the first terminal of the diode unit, and a second terminal coupled to the second terminal of the diode unit.

6. The reference voltage generator of claim 1, wherein the diode unit comprises:
    a sixth transistor comprising a first terminal coupled to the first terminal of the diode unit, a second terminal coupled to the second terminal of the diode unit, and a control terminal coupled to the first terminal of the sixth transistor.

7. The reference voltage generator of claim 6, wherein the first transistor, the third transistor and the sixth transistor are of an identical type of transistor.

8. The reference voltage generator of claim 6, wherein the sixth transistor is a heterojunction bipolar transistor or a field effect transistor.

9. The reference voltage generator of claim 1, wherein:
    the second transistor is formed using n transistors;
    each of the n transistors comprises a first terminal coupled to the first terminal of the second transistor, a second terminal coupled to the second terminal of the second transistor, and a control terminal coupled to the control terminal of the second transistor; and n is a positive integer larger than zero.

10. A bias voltage generator comprising:
a reference voltage generator comprising:
    an output terminal configured to output a reference voltage;
    a first resistor comprising a first terminal, and a second terminal;
    a first transistor comprising a first terminal, a second terminal coupled to the second terminal of the first resistor, and a control terminal coupled to the first terminal of the first transistor;
    a second transistor comprising a first terminal, a second terminal coupled to the first terminal of the first resistor, and a control terminal coupled to the control terminal of the first transistor;
    a second resistor comprising a first terminal, and a second terminal coupled to the first terminal of the first transistor;
    a third resistor comprising a first terminal coupled to the first terminal of the second resistor, and a second terminal coupled to the first terminal of the second transistor;
    a fourth resistor comprising a first terminal coupled to a first reference voltage terminal, and a second terminal;
    a third transistor comprising a first terminal coupled to the second terminal of the fourth resistor, a second terminal coupled to the second terminal of the first resistor and a second reference voltage terminal, and a control terminal coupled to the first terminal of the second transistor or the control terminal of the second transistor;
    a diode unit comprising a first terminal coupled to the output terminal of the reference voltage generator, and a second terminal coupled to the first terminal of the third resistor; and
    a fourth transistor comprising a first terminal coupled to the first terminal of the fourth resistor, a second terminal coupled to the first terminal of the diode unit, and a control terminal coupled to the second terminal of the fourth resistor; and
a bias circuit comprising an input terminal coupled to the output terminal of the reference voltage generator, and an output terminal coupled to a bias terminal of an amplifier.

11. The bias voltage generator of claim 10, wherein a first current flowing to the input terminal of the bias circuit and/or a second current flowing to the amplifier is substantially invariant with temperature.

12. The bias voltage generator of claim 10, wherein:
the bias circuit comprises a fifth transistor comprising a first terminal, a second terminal coupled to the output terminal of the bias circuit for outputting a bias voltage to the amplifier, and a control terminal; and
the amplifier comprises a sixth transistor comprising a first terminal, a second terminal coupled to the second reference voltage terminal, and a control terminal coupled to the bias terminal of the amplifier.

13. The bias voltage generator of claim 12, wherein the bias circuit further comprises:
a seventh transistor comprising a first terminal coupled to the control terminal of the fifth transistor, a second terminal, and a control terminal coupled to the output terminal of the bias circuit;

a fifth resistor comprising a first terminal coupled to the input terminal of the bias circuit, and a second terminal coupled to the first terminal of the seventh transistor;
a sixth resistor comprising a first terminal coupled to the second terminal of the seventh transistor, and a second terminal coupled to the second reference voltage terminal;
a seventh resistor comprising a first terminal coupled to the second terminal of the fifth transistor, and a second terminal coupled to the second reference voltage terminal; and
an eighth resistor comprising a first terminal coupled to a third reference voltage terminal, and a second terminal coupled to the first terminal of the fifth transistor;
wherein the amplifier further comprises:
a eighth transistor comprising a first terminal coupled to the third reference voltage terminal, a second terminal coupled to the first terminal of the sixth transistor, and a control terminal coupled to the first terminal of the fifth resistor.

14. The bias voltage generator of claim 12, wherein the bias circuit further comprises:
a fifth resistor comprising a first terminal coupled to the input terminal of the bias circuit, and a second terminal;
a seventh transistor comprising a first terminal coupled to the second terminal of the fifth resistor, a second terminal, and a control terminal;
an eighth transistor comprising a first terminal coupled to the first terminal of the fifth transistor, a second terminal coupled to the control terminal of the seventh transistor, and a control terminal coupled to the first terminal of the seventh transistor and the control terminal of the fifth transistor;
a sixth resistor comprising a first terminal coupled to the second terminal of the seventh transistor, and a second terminal coupled to the second reference voltage terminal;
a seventh resistor comprising a first terminal coupled to the second terminal of the eighth transistor, and a second terminal coupled to the second reference voltage terminal;
an eighth resistor comprising a first terminal coupled to a third reference voltage terminal, and a second terminal coupled to the first terminal of the fifth transistor; and
a capacitor comprising a first terminal coupled to the control terminal of the fifth transistor, and a second terminal coupled to the second reference voltage terminal;
wherein the amplifier further comprises:
a ninth transistor comprising a first terminal coupled to the third reference voltage terminal, a second terminal coupled to the first terminal of the sixth transistor, and a control terminal coupled to the first terminal of the fifth resistor.

15. The bias voltage generator of claim 12, wherein the first terminal of the sixth transistor is coupled to a third reference voltage terminal;
wherein the bias circuit further comprises:
a fifth resistor comprising a first terminal coupled to the input terminal of the bias circuit, and a second terminal coupled to the control terminal of the fifth transistor;
a seventh transistor comprising a first terminal coupled to the second terminal of the fifth resistor, a second terminal, and a control terminal;
an eighth transistor comprising a first terminal coupled to the first terminal of the fifth transistor, a second terminal coupled to the control terminal of the seventh transistor, and a control terminal coupled to the first terminal of the seventh transistor;

a sixth resistor comprising a first terminal coupled to the second terminal of the seventh transistor, and a second terminal coupled to the second reference voltage terminal;

a seventh resistor comprising a first terminal coupled to the second terminal of the eighth transistor, and a second terminal coupled to the second reference voltage terminal;

an eighth resistor comprising a first terminal coupled to the third reference voltage terminal, and a second terminal coupled to the first terminal of the fifth transistor; and a capacitor comprising a first terminal coupled to the control terminal of the fifth transistor, and a second terminal coupled to the second reference voltage terminal.

16. The bias voltage generator of claim 12, wherein the first terminal of the fifth transistor and the first terminal of the sixth transistor are coupled to a third reference voltage terminal;

wherein the bias circuit further comprises:

a fifth resistor comprising a first terminal coupled to the input terminal of the bias circuit, and a second terminal coupled to the control terminal of the fifth transistor;

a seventh transistor comprising a first terminal coupled to the second terminal of the fifth resistor, a second terminal, and a control terminal coupled to the first terminal of the seventh transistor; and an eighth transistor comprising a first terminal coupled to the second terminal of the seventh transistor, a second terminal coupled to the second reference voltage terminal, and a control terminal coupled to the first terminal of the eighth transistor.

17. The bias voltage generator of claim 16, wherein the diode unit comprises:

a ninth transistor comprising a first terminal coupled to the first terminal of the diode unit, a second terminal coupled to the second terminal of the diode unit, and a control terminal coupled to the first terminal of the ninth transistor.

18. The bias voltage generator of claim 17, wherein the first transistor, the third transistor, the fifth transistor, the sixth transistor, the seventh transistor, the eighth transistor, and the ninth transistor have a substantially identical temperature coefficient.

19. The bias voltage generator of claim 17, wherein the first transistor, the third transistor, the fifth transistor, the sixth transistor, the seventh transistor, the eighth transistor, and the ninth transistor are of an identical type of transistor.

20. The bias voltage generator of claim 19, wherein the first transistor, the third transistor, the fifth transistor, the sixth transistor, the seventh transistor, the eighth transistor, and the ninth transistor are of an identical type of transistor that is a heterojunction bipolar transistor or a field effect transistor.

\* \* \* \* \*